Patented Apr. 15, 1941

2,238,776

UNITED STATES PATENT OFFICE 2,238,776

COMPOSITION OF MATTER

Werner E. Kleinicke, Coalwood, W. Va., assignor to The Johnson-March Corporation, New York, N. Y., a corporation of Delaware No Drawing. Application February 21, 1939, Serial No. 257,657

23 Claims. (Cl. 44—6)

This invention relates to a new composition of matter and method for its production.

The new composition in accordance with this invention is adapted for various use advantageously in the commercial arts. Thus, by way of example, the new composition in accordance with this invention lends itself admirably to use in the treatment of coal for rendering it dustproof, for use in soil stabilization in connection with the construction of roadways, and the like, and to various other uses.

The new composition in accordance with this invention from the broad standpoint will comprise essentially a hygroscopic, non-deliquescent, organic colloid capable of forming a gel with water, a water-soluble, crystallizable salt adapted to lower substantially the freezing point of water and an oil. More specifically, the composition in accordance with this invention may include a resin in addition to the ingredients just specified.

More particularly the composition in accordance with this invention will include the several ingredients within certain amounts. Thus, the hygroscopic, non-deliquescent colloid capable of forming a gel with water will be present in amount from about 0.1 to 1.25 pounds, the salt in the amount of about 1.0 to 6.0 pounds and the oil in amount of about 0.1 to 1.0 pound.

Where resin is included in the composition, the oil and resin together will be in the amount of 0.1 to 3.0 pounds to salt and colloid within the ranges of the amounts given above and the oil and resin will be in the proportion of 9-1 to 1-1 pounds by weight.

The hygroscopic, non-deliquescent organic colloid included in the composition in accordance with this invention may, for example, be a starch, as cornstarch, gelatin, or decomposition products therefrom, such as dextrine, agar-agar, ammoniacal casein, or other organic colloid capable of forming a gel in the presence of water or a mixture thereof. Preferably, but not in any sense necessarily, the colloid will be a cornstarch containing up to 6% of naturally incrusted glutinous matter. The crystallizable salt component of the composition may; for example, be zinc chloride, magnesium chloride, calcium chloride, or other water-soluble, crystallizable salt, or mixtures thereof, capable of substantially lowering the freezing point of water.

Preferably, but not in any sense necessarily, calcium chloride will be used, more particularly because of its cheapness and efficiency.

The oil may be any suitable mineral, vegetable or animal oil. Thus, for example, petroleum oils, such as various lubricating oils or waxes may be used. Various animal oils, as lard oil and various fish oils, may be used and various vegetable oils, as for example, linseed oil, chinawood oil, pine oil, olive oil, and the like, may be used. Of course, where desired mixtures of oils may be used. Preferably, but in no sense essentially, a relatively heavy mineral oil, having a Saybolt Universal viscosity of 300 seconds or more at 100 degrees Fahrenheit may be used because of its cheapness, efficiency and comparatively pronounced chemical inertia. Where a resin is included in the composition, the resin may be a natural resin or a synthetic resin. Thus, for example, common rosin, phenolic type resins, or other oil soluble natural or synthetic resins may be used. Desirably, but in no sense essentially, the resin may comprise common rosin.

While in the absence of oil organic colloids, such as starch, would suffer partial decomposition through the strong water absorbent influence of a deliquescent substance, like calcium chloride, within a few days, the oil in the composition thus produced appears to afford sufficient protection against break-down of the colloid. In other words, there is no need to convert the dry composition into an aqueous emulsion immediately after its manufacture, and it may be stored for a long time in a dry place before being used for its ultimate purpose.

The composition thus produced will be in a dry state despite the high water-absorbent power of the deliquescent salt.

The composition in the dry state is adaptable for various use, for example, in soil stabilization in connection with the construction of roadways, and the like, where it has proven its superiority to plain calcium chloride and to various other uses.

The composition as produced in the dry state may be admixed with water for the production of a solution of the water-soluble crystallizable salt and the colloid containing the oil emulsified in internal phase. Such admixtures may be prepared to result in a final consistency of either a paste or a free-flowing liquid. The success of making them depends largely upon the amount of initial dissolution water used, and it is of general importance to say that it should never to more than the dissolution heat of the deliquescent salt can warm up to a temperature of at least 120 degrees Fahrenheit, unless it is desired to use artificial heat. For the preparation of free-flowing liquids dilution may begin after all ingredients are dissolved and emulsified in the initial dissolution water. Solutions or admixtures of the composition according to this invention in water lend themselves for use advantageously in the treatment of coal for rendering it dustproof.

Where the composition in accordance with this invention is desired in solution or in admixture with water, such may be prepared directly in accordance with this invention. Thus, the hygroscopic, non-deliquescent organic colloid and the oil, or oil and resin, may be mixed with water and the water-soluble crystallizable salt then added with agitation. In this case also, the initial dissolution water should be such in amount as to permit a rise of temperature within the mixture from normal to approximately 120 degrees Fahrenheit, in order to avoid the application of artificial heat. But even if additional heat is employed, restraint should be exercised regarding the amount of initial water, because the oil will usually resist proper emulsification in a medium which, initially, is too dilute. The solution may be diluted by the addition of a further quantity of cold water after the mixture thickens.

As more specifically illustrative of the composition in accordance with this invention, for example, a composition adaptable for use in the treatment of coal may be made up on the following formula:

| | | |
|---|---|---|
| Calcium chloride (flake) | pounds | 100 |
| Cornstarch | do | 3 |
| Heavy lubricating oil or Vaseline | do | 3 |

The ingredients of the above formula will be first mixed by mixing the heavy oil with the cornstarch, then mixing with the calcium chloride in a dry mixer.

Where it is desired to store the dry mixture for a comparatively short time, say one to two months, a heavy lubricating oil or Vaseline may be used. If a storage period of more than three months is contemplated, the ordinary oils mentioned above should be replaced with a high grade white paraffine oil in equal amounts.

Where it is desired to produce a solution of the composition according to the above formula, such may be readily accomplished by admixing with from 15 to 22 gallons of water, approximately, until the mixture has become quite viscous and the oil properly emulsified, and finally adding sufficient water to make 50 gallons of material. Adherence to this method of preparation affords a permanent emulsion of free-flowing characteristics even at temperatures substantially below the freezing point of water, without the use of colloid mills or special high-speed mixers.

Where it is desired to produce a solution in the initial stage, such may be readily accomplished, for the making of say 50 gallons of solution, by adding the entire amount of organic colloid, as cornstarch, and oil to say 15 to 22 gallons of water, with agitation, then adding the calcium chloride with continued agitation. The dissolution heat of the calcium chloride is sufficient to swell the starch and bring it into a colloidal solution to produce a thick oily liquid. At the same time the oil or Vaseline will be emulsified in disperse phase in the solution. When the mixture has thickened, the balance of the water will be added with agitation to dilute the solution.

In the method of preparation as outlined in the previous paragraph, the emulsification of the oil may be greatly facilitated if the salt is first coated with the oil and then added to the aqueous suspension of the colloid. This means of preparation does not only permit the use of a low-speed paddle mixer, but also produces a very finely dispersed oil. The stability of this type of emulsion is outstanding.

Where it is desired to produce the composition directly in solution in or in admixture with water, such may be accomplished, by way of further example, on the following formula:

| | | |
|---|---|---|
| Calcium chloride | pounds | 2 |
| Cornstarch | do | 0.16 |
| High viscosity mineral oil | do | 0.32 |
| Water | fluid ounces | 112 |

In the composition according to the above formula, for the oil component may be substituted from 0.08 to 0.8 pound of a mixture of high viscosity mineral oil and a resin such as, for example, rosin, comprising one part by weight of gum rosin and two parts by weight of heavy mineral oil.

The mixture in accordance with the above formula will be prepared as indicated above by first admixing the starch and oil, or a mixture of oil and resin, with about one-third of the water, then adding the calcium chloride with agitation and finally, when the mixture thickens, thinning by addition of the balance of the water. The method of preparation may also be varied as explained above.

Where it is desired to produce a liquid composition containing large amounts of oil, such may be accomplished, by way of further example on the following formula:

| | | |
|---|---|---|
| Heavy oil | pounds | 3,335 |
| Rosin | do | 1,667 |
| Calcium chloride | do | 2,667 |
| Cornstarch | do | 320 |

The mixture in accordance with the above formula is best prepared by first suspending the starch in approximately 400 gallons of water. Then calcium chloride is added with agitation. When the dissolution heat has swollen the starch completely and the mixture has attained a pasty and glassy appearance, the oil-rosin solution, which meanwhile has been prepared in another tank with the aid of artificial heat, is fed slowly into the pasty mass. The whole mixture is stirred until a light yellow color and opaqueness indicate a thorough emulsification. After this point has been reached, enough water is added to make 2,000 gallons of final solution. A very durable emulsion of high oil contents may also be prepared by means of the following formula:

| | | |
|---|---|---|
| Rosin | pounds | 2½ |
| Oil | do | 5 |
| Calcium chloride | do | 4 |
| Dextrine | do | 2 |
| Cornstarch | do | 0.32 |

The method of preparation closely follows the one described above. First, the dextrine is dissolved in 3 quarts of water. Then the cornstarch is suspended therein, and finally calcium chloride is added and dissolved by means of agitation. The rosin-oil mixture previously united by heat is then emulsified in the watery paste, and after proper emulsification the whole mixture is diluted with sufficient water to make 3 gallons.

The composition according to this invention in solution in or in admixture with water lends itself, as has been indicated, with exceptional advantage to the treatment of coal for rendering it dustless, preventing freezing, giving to the coal a desirable appearance and variously for other advantageous effects.

For the treatment of coal the coal will generally be treated in the form of free-flowing fragments or particles, usually of irregular form, and the treatment will generally be applied by spraying the composition on the fragments or particles of coal, it being noted that the composition in liquid form, for example, according to the above formula, will be of a viscosity such that it may be readily and economically sprayed on particles or fragments of coal in flow, for example, at the end of a loading boom.

For the treatment of coal, the composition in accordance with this invention, more especially in liquid form, possesses the greatest advantage in that on application of the composition in liquid form to free-flowing fragments or particles of coal by spraying, the fragments or particles of coal become thoroughly coated. Subsequently the water, or the major part of the water, evaporates or is lost, with the result that the particles or fragments of coal are coated with a thin coat or film of water-soluble, crystallizable salt, starch and oil. The crystallizable salt attracts moisture from the atmosphere and maintains the coal moist and dustless. The starch operates to maintain the crystallizable salt in place on the coal and renders material assistance to the salt to collect any particles of dust which may be formed as the coal may be agitated in the mass in transfer, as, for example, in coal cars or in the chuting, or other transference of the coal. The oil will have the effect of rendering the film on the particles or fragments of coal substantially resistant to the effects of water in the form of rain and will prevent the washing off of the film even under the pounding of hard, continuous rain.

The presence of the crystallizable salt in the film coating on the particles or fragments of coal will prevent the coal from freezing even at extremely low temperatures and such will be facilitated by the presence of the oil. Despite the presence of the oil, the composition is substantially odorless and where a resin, as for example, rosin, is included in the composition such will have the effect of giving to the composition a slight and very agreeable resinous odor, which, however, can be detected no more after the composition has been applied to the coal.

The composition according to this invention as prepared for the treatment of coal has the very great advantage of being non-inflammable despite the inclusion of an oil, such as a mineral oil, which may per se be normally inflammable, especially upon atomization. The composition as used in the treatment of coal affords no element of danger from the vaporization of oil in the spraying operation and the composition is substantially non-corrosive and therefore will not injure coal handling machinery or metallic storage or transportation containers.

The composition according to this invention as produced in the dry state, as described above, is possessed of the advantages of being substantially odorless, non-corrosive, non-inflammable and will remain permanently in a semi-plastic state due to the fact that the oil forms a protective coating about the other constituents which are more susceptible to the attack of water. For the same reason water, in the form of rain, etc., will not wash away the starch film or the water-soluble crystallizable salt.

In the semi-dry state, the composition is extremely sticky. For this reason, it will not easily penetrate into the interior of the coal particles to which it has been applied, but unlike plain oils, will remain indefinitely on the surface where a dust agglutinant of any description should remain in order to be of permanent efficiency.

Despite the permanency of its semi-dry state, the composition in accordance with this invention may be readily admixed with water, with the result that the water-soluble, crystallizable salt goes into solution in the water. The organic colloid is converted to the colloidal state and the oil is emulsified in the solution in disperse phase, despite the presence of the water-soluble, crystallizable salt, which ordinarily would inhibit the formation of an emulsion.

In the dry state, as has been indicated, the composition in accordance with this invention lends itself to use in soil stabilization, for example, in connection with the construction of highways. In such use the composition in a dry state is admixed with the various soils admixed for the formation of a stabilized mixture and in such a mixture acts to maintain the water or moisture balance.

In road stabilization work applicant's composition can also be used to advantage in form of a paste. Such pastes may contain the oil in either external or internal phase of dispersion. Pastes containing the oil in internal phase, are prepared by the method described above except that less dissolution water is added. To produce a paste having the oil in external phase, the solution of the water-soluble colloid and the crystallizable salt is stirred gradually into the oil, and agitation is continued until a stiff paste of almost white appearance is attained. By way of example, 2½ gallons of a solution comprising 2 pounds of calcium chloride and 0.16 pound of starch per gallon, are gradually stirred into one gallon of heavy lubricating oil or the mixture of lubricating oil and rosin described above.

It will be appreciated that it is not intended to limit this invention to the details herein given by way of example and illustration, it being obvious that various modification in the composition and method for its production may be made without departing from the scope of this invention. Further, it will be appreciated that the composition in accordance with this invention, in both its solid paste and liquid form, is adapted for various uses other than those more particularly mentioned herein.

What I claim and desire to protect by Letters Patent is:

1. A non-fluid composition of matter comprising a solid, water-soluble, neutral, deliquescent, crystallizable salt capable of lowering the freezing point of water, a hygroscopic, normally solid, non-deliquescent colloid capable of forming a gel with water in admixture with the salt in minor proportion and a water-insoluble non-drying oil substantially non-evaporable at atmospheric temperatures in minor proportions, the composition being characterized by the fact that the water-soluble salt and the colloid retain their solid form and that oil is coated on the colloid.

2. A non-fluid composition of matter comprising a water-soluble, neutral, deliquescent, crystallizable salt capable of lowering the freezing point of water, a hygroscopic, normally solid, non-deliquescent colloid capable of forming a gel with water in admixture with salt in minor proportion and a water-insoluble white paraffine oil substantially non-evaporable at atmospheric temperatures in minor proportion, the composition being characterized by the fact that the water-soluble salt and the colloid retain their solid form and that oil is coated on the colloid.

3. A non-fluid composition of matter comprising a water-soluble, neutral, deliquescent, crystallizable salt capable of lowering the freezing point of water, a hygroscopic, normally solid, non-deliquescent colloid capable of forming a gel with water in admixture with the salt in minor proportion, a water-insoluble non-drying oil substantially non-evaporable at atmospheric temperatures, and an oil-soluble resin the oil and resin together being in minor proportion and the composition being characterized by the fact that the water-soluble salt and the colloid retain their solid form and that oil is coated on the colloid.

4. A non-fluid composition of matter comprising a water-soluble, neutral, deliquescent, crystallizable salt capable of lowering the freezing point of water, a hygroscopic, normally solid, non-deliquescent colloid capable of forming a gel with water in admixture with the salt in minor proportion and a mineral oil substantially non-evaporable at atmospheric temperatures, the composition being characterized by the fact that the water-soluble salt and the colloid retain their solid form and that oil is coated on the colloid.

5. A composition of matter comprising on the basis of one gallon, a water-soluble, neutral, deliquescent, crystallizable salt capable of lowering the freezing point of water, about 2.0 pounds, a hygroscopic, normally solid, non-deliquescent colloid capable of forming a gel with water, about 0.16 pound, a water-insoluble non-drying oil substantially non-evaporable at atmospheric temperatures, about 0.32 pound, and the balance water.

6. A composition of matter comprising a water-soluble, neutral, deliquescent, crystallizable salt capable of lowering the freezing point of water, a hygroscopic, normally solid, non-deliquescent colloid capable of forming a gel with water, and a water-insoluble non-drying oil substantially non-evaporable at atmospheric temperatures in the proportion of about 1 to 6 pounds of salt to about 0.1 to 0.25 pound of organic colloid to about 0.1 to 1.0 pound of oil, the composition being characterized by the fact that the water-soluble salt and the colloid retain their solid form and that oil is coated on the colloid.

7. A composition of matter comprising a water-soluble, neutral, deliquescent, crystallizable salt capable of lowering the freezing point of water, a hygroscopic, normally solid, non-deliquescent colloid capable of forming a gel with water, a water-insoluble non-drying oil substantially non-evaporable at atmospheric temperatures, and a resin, in the proportion of about 1 to 6 pounds of salt to about 0.1 to 1.25 pounds of organic colloid to about 0.1 to 3.0 pounds of oil and an oil-soluble resin together, the composition being characterized by the fact that the water-soluble salt and the colloid retain their solid form and that oil is coated on the colloid.

8. A composition of matter comprising a water-soluble, neutral, deliquescent, crystallizable salt capable of lowering the freezing point of water, a hygroscopic, normally solid, non-deliquescent colloid capable of forming a gel with water, a water-insoluble non-drying oil substantially non-evaporable at atmospheric temperatures, and an oil-soluble resin, in the proportion of about 1 to 6 pounds of salt to about 0.1 to 1.25 pounds of organic colloid to about 0.1 to 3.0 pounds of oil and resin together in admixture with water.

9. A composition of matter comprising a water-soluble, neutral, deliquescent, crystallizable salt capable of lowering the freezing point of water, a hygroscopic, normally solid, non-deliquescent colloid capable of forming a gel with water, a water-insoluble non-drying oil substantially non-evaporable at atmospheric temperatures, and an oil-soluble resin, in the proportion of about 1 to 6 pounds of salt to about 0.1 to 1.25 pounds of organic colloid, to 0.1 to 3.0 pounds of oil and resin together, the oil and resin being in the proportion of 9–1 to 1–1 parts by weight, the composition being characterized by the fact that the water-soluble salt and the colloid retain their solid form and that oil is coated on the colloid.

10. A non-fluid composition of matter comprising a water-soluble, neutral, deliquescent, crystallizable salt capable of lowering the freezing point of water, a hygroscopic, normally solid, non-deliquescent colloid capable of forming a gel with water in admixture with the salt in minor proportion, a non-drying oil substantially non-evaporable at atmospheric temperatures, and rosin, the oil and resin together being in minor proportion and the composition being characterized by the fact that the water-soluble salt and the colloid retain their solid form and that oil is coated on the colloid.

11. A non-fluid composition of matter comprising calcium chloride, starch admixed with the calcium chloride in minor proportion and a water-insoluble non-drying oil substantially non-evaporable at atmospheric temperatures in minor proportion, the composition being characterized by the fact that the calcium chloride and the starch retain their solid form and that oil is coated on the starch.

12. A non-fluid composition of matter comprising calcium chloride, starch in admixture with the calcium chloride in minor proportion, a water-insoluble non-drying oil substantially non-evaporable at atmospheric temperatures, and a resin soluble in the oil, the oil and resin together being in minor proportion, the composition being characterized by the fact that the calcium chloride and the starch retain their solid form and that oil is coated on the starch.

13. A non-fluid composition of matter comprising calcium chloride, starch in admixture with the calcium chloride in minor proportion and a mineral oil substantially non-evaporable at atmospheric temperatures in minor proportion, the composition being characterized by the fact that the calcium chloride and the starch retain their solid form and that oil is coated on the starch.

14. A non-fluid composition of matter comprising calcium chloride, starch in admixture with the calcium chloride in minor proportion, a mineral oil substantially non-evaporable at atmospheric temperatures, and rosin, the rosin and oil together being in minor proportion, the composition being characterized by the fact that the calcium chloride and the starch retain their solid form and that oil is coated on the starch.

15. A combustible fuel comprising free-flowing irregular fragments or particles of fuel surface-coated with a semi-dry composition comprising a mixture of a hygroscopic, normally solid, non-deliquescent colloid capable of forming a gel with water, a water-soluble, neutral, deliquescent, crystallizable salt adapted to lower the freezing point of water and a water-insoluble non-drying oil substantially non-evaporable at atmospheric temperatures, in the proportion of about 1 to 6 pounds of salt to about 0.1 to 0.25 pound of organic colloid to about 0.1 to 1.0 pound of oil.

16. A combustible fuel comprising free-flowing irregular fragments or particles of fuel surface coated with a semi-dry composition comprising a mixture of a hygroscopic, normally solid, non-deliquescent colloid capable of forming a gel with water, a water-soluble, neutral, deliquescent, crystallizable salt adapted to lower the freezing point of water, a water-insoluble non-drying oil substantially non-evaporable at atmospheric temperatures, and an oil-soluble resin, in the proportion of about 1 to 6 pounds of salt to about 0.1 to 1.25 pounds of organic colloid to about 0.1 to 3.0 pounds of oil and resin together, the oil and resin being in the proportion of 9–1 to 1–1 parts by weight.

17. A composition of matter comprising on the basis of one gallon, a water-soluble, neutral, deliquescent, crystallizable salt capable of lowering the freezing point of water, about 2.0 pounds, a hygroscopic, normally solid, non-deliquescent colloid capable of forming a gel with water, about 0.16 pound, a water-insoluble non-drying oil substantially non-evaporable at atmospheric temperatures, about 0.16 pound, and the balance water.

18. A combustible fuel comprising free-flowing irregular fragments or particles of fuel surface-coated with a semi-dry composition comprising a mixture of calcium chloride, starch in minor proportion and a non-drying oil in minor proportion.

19. A combustible fuel comprising free-flowing irregular fragments or particles of fuel surface-coated with a semi-dry composition comprising a mixture of calcium chloride, starch and mineral oil in the proportion of about 2 pounds of calcium chloride, about 0.16 pound of starch and about 0.16 pound of mineral oil.

20. A combustible fuel comprising free-flowing irregular fragments or particles of fuel surface-coated with a semi-dry composition comprising a mixture of calcium chloride, starch and mineral oil in the proportion of about 2 pounds of calcium chloride, about 0.16 pound of starch and about 0.32 pound of mineral oil.

21. A non-fluid composition comprising calcium chloride, starch and a non-drying oil in proportion on the basis of 2 pounds of calcium chloride, 0.16 pound starch and 0.32 pound of mineral oil, the composition being characterized by the fact that the calcium chloride and the starch retain their solid form and that oil is coated on the starch.

22. A non-fluid composition comprising calcium chloride, starch and a non-drying oil in proportion on the basis of 2 pounds of calcium chloride, 0.16 pound starch and 0.16 pound of mineral oil, the composition being characterized by the fact that the calcium chloride and the starch retain their solid form and that oil is coated on the starch.

23. A combustible fuel comprising free-flowing irregular fragments or particles of fuel surface-coated with a semi-dry composition comprising a mixture of a water-soluble, neutral, deliquescent, crystallazible salt capable of lowering the freezing point of water, a hygroscopic, normally solid, non-deliquescent colloid capable of forming a gel with water admixed with the salt in minor proportion, and a non-drying oil in minor proportion.

WERNER E. KLEINICKE.